United States Patent
Peterson et al.

(10) Patent No.: US 10,470,369 B2
(45) Date of Patent: Nov. 12, 2019

(54) AGRICULTURAL VEHICLE WITH ACTIVE EDGE WINDROW CHUTE

(71) Applicant: CNH Industrial America LLC, New Holland, PA (US)

(72) Inventors: Jay D. Peterson, Andover, IL (US); Craig E. Murray, Davenport, IA (US); Justin L. Montenguise, Bettendorf, IA (US)

(73) Assignee: CNH Industrial America LLC, New Holland, PA (US)

( * ) Notice: Subject to any disclaimer, the term of this patent is extended or adjusted under 35 U.S.C. 154(b) by 130 days.

(21) Appl. No.: 15/581,249

(22) Filed: Apr. 28, 2017

(65) Prior Publication Data

US 2018/0310477 A1 Nov. 1, 2018

(51) Int. Cl.
*A01D 57/30* (2006.01)
*A01D 43/08* (2006.01)
(Continued)

(52) U.S. Cl.
CPC ......... *A01D 57/30* (2013.01); *A01D 41/1243* (2013.01); *A01D 43/08* (2013.01); *A01D 61/002* (2013.01)

(58) Field of Classification Search
CPC .... A01D 87/0007; A01D 41/06; A01D 41/10; A01D 41/1243; A01D 43/08;
(Continued)

(56) References Cited

U.S. PATENT DOCUMENTS 2,609,080 A * 9/1952 Overman ........... A01D 41/1243
198/315
4,947,626 A * 8/1990 Maier .................... A01D 43/10
56/364
(Continued)

FOREIGN PATENT DOCUMENTS

DE 102008040125 A1 2/2009
DE 202016102139 U1 * 7/2016 ......... A01D 41/1243
(Continued)

OTHER PUBLICATIONS

European Search Report for European Application No. 18169750.9, dated Aug. 24, 2018 (4 pages).

*Primary Examiner* — Alicia Torres
*Assistant Examiner* — Adam J Behrens
(74) *Attorney, Agent, or Firm* — Peter K. Zacharias; Patrick M. Sheldrake (57) ABSTRACT

An agricultural vehicle includes: a chassis; a header carried by the chassis and configured to cut crop material; a chopper carried by the chassis downstream of the header; a spreader assembly carried by the chassis downstream of the chopper; and a windrow assembly carried by the chassis downstream of the chopper. The windrow assembly includes: a windrow chute defining a chute surface and a leading edge downstream from the chopper; and a rotatable conveyor associated with the leading edge and having a surface with at least one conveyor projection extending from the surface, the at least one conveyor projection being configured to convey crop material toward at least one of the chute surface and the spreader assembly during rotation.

10 Claims, 8 Drawing Sheets

(51) Int. Cl.
*A01D 61/00* (2006.01)
*A01D 41/12* (2006.01)

(58) Field of Classification Search
CPC ...... A01D 43/005; A01D 43/10; A01D 57/30; A01D 61/002
See application file for complete search history.

(56) References Cited

U.S. PATENT DOCUMENTS

| | | | | |
|---|---|---|---|---|
| 5,941,768 | A * | 8/1999 | Flamme | A01D 43/07 209/135 |
| 6,688,972 | B2 | 2/2004 | Büermann et al. | |
| 7,455,584 | B2 * | 11/2008 | Farley | A01D 41/1243 460/111 |
| 9,259,011 | B2 * | 2/2016 | Thomas | B02C 18/225 |
| 2005/0277454 | A1 * | 12/2005 | Couture | A01D 41/1243 460/111 |
| 2011/0237316 | A1 * | 9/2011 | Isaac | A01D 41/1243 460/111 |
| 2013/0324199 | A1 * | 12/2013 | Roberge | A01D 41/1243 460/111 |
| 2016/0106024 | A1 * | 4/2016 | Ricketts | A01D 41/1243 460/111 |
| 2016/0135377 | A1 | 5/2016 | Ballegeer et al. | |
| 2016/0192587 | A1 * | 7/2016 | Ballegeer | A01D 41/1243 460/111 |
| 2017/0079207 | A1 * | 3/2017 | Puryk | A01D 41/1243 |
| 2018/0007831 | A1 * | 1/2018 | Ballegeer | A01D 41/1243 |

FOREIGN PATENT DOCUMENTS

| | | | |
|---|---|---|---|
| DE | 102015220560 A1 | 4/2017 | |
| EP | 0631717 A1 * | 1/1995 | ......... A01D 41/1243 |
| EP | 1461991 A2 | 9/2004 | |
| WO | 2016/105457 A2 | 6/2016 | |

\* cited by examiner

AGRICULTURAL VEHICLE WITH ACTIVE EDGE WINDROW CHUTE

FIELD OF THE INVENTION

The present invention relates to agricultural vehicles, and, more particularly, to agricultural vehicles which include windrow and spreader assemblies.

BACKGROUND OF THE INVENTION

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

During the process of harvesting in a combine, the desired grain is gathered and saved while crop material other than the desired grain is expelled from the combine. The non-grain crop material or crop residue is usually derived from two areas in the combine, the threshing rotor and the cleaning system. The material expelled from the threshing rotor is generally referred to as straw and includes much of the larger plant material such as stalks, stems, cobbs leaves and the like as well as foreign or non-crop material. The material expelled from the cleaning system is generally referred to as chaff and includes much of the finer plant material residue, such as pods, husk fragments and particulates. The combined flows of crop residue to be expelled from the combine can be dealt with in several ways; however, the processes for redepositing the residue material back into the field can be categorized generally as either windrowing or spreading.

In a windrowing process, the crop residue is deposited onto the harvested crop stubble in a continuous narrow stream or windrow, which is narrower than the harvested swath width. Accumulated in this manner, the windrowed residue material can be picked up easily for baling or other subsequent processing or use. To windrow the crop residue, the residue is directed to a windrow assembly held at the rear of the vehicle. The windrow assembly includes a chute the residue travels along and vanes or a different mechanism for controlling the width of the windrow that is left on the field.

In a spreading process, a mechanical device, which can be referred to as a "spreader assembly" or simply a "spreader," distributes the straw and/or chaff evenly across the extent of the combine header cutting width. Spreaders generally include a spreader disc with attached fins that rotate to spread the material during rotation of the spreader disc. The material to be spread is usually chopped to a short length so that after spreading the material will break down quickly to add nutrients to the soil and/or to be sufficiently small so as to not interfere with subsequent tilling or seeding operations.

One particular problem that occurs when windrowing crop residue is hair pinning at the leading edge of the windrow chute. Since the leading edge must be properly spaced to protect the windrowed residue from being disturbed by the wind generated by the spreader, catch all straw coming from the threshing rotor and not catch chaff coming from the cleaning system, some of the crop residue passing the leading edge will tend to accumulate on the leading edge. Once some crop residue accumulates on the leading edge, the accumulation at the leading edge can quickly build up and disrupt operation of the combine.

What is needed in the art is a windrow assembly for an agricultural vehicle which is less prone to material accumulation at the leading edge.

SUMMARY OF THE INVENTION

In accordance with an aspect of the present invention, there is provided a windrow assembly with a windrow chute and a rotatable conveyor associated with a leading edge of the windrow chute and having a surface with at least one conveyor projection extending from the surface.

In accordance with another aspect of the present invention, there is provided an agricultural vehicle including: a chassis; a header carried by the chassis and configured to cut crop material; a chopper carried by the chassis downstream of the header; a spreader assembly carried by the chassis downstream of the chopper; and a windrow assembly carried by the chassis downstream of the chopper. The windrow assembly includes: a windrow chute defining a chute surface and a leading edge downstream from the chopper; and a rotatable conveyor associated with the leading edge and having a surface with at least one conveyor projection extending from the surface, the at least one conveyor projection being configured to convey crop material toward at least one of the chute surface and the spreader assembly during rotation.

In accordance with yet another aspect of the present invention, there is provided a windrow assembly including: a windrow chute defining a leading edge and a trailing edge opposite the leading edge; and a rotatable conveyor associated with the leading edge and having a surface with at least one conveyor projection extending from the surface, the at least one conveyor projection being configured to convey crop material at least one of away from the leading edge toward the trailing edge and away from both the leading edge and the trailing edge.

An advantage of the agricultural vehicle and windrow assembly described herein is that the conveyor projection(s) can produce an aggressive crop material conveyor to move crop material during operation and reduce the likelihood of crop material accumulation on the leading edge of the windrow chute.

Another advantage of the agricultural vehicle and windrow assembly described herein is that the conveyor projection(s) can move crop material away from lateral sides of the windrow assembly to reduce the likelihood of crop stagnation.

Still another advantage of the agricultural vehicle and windrow assembly described herein is that the conveyor projection(s) can direct crop material toward the chute surface or spreader assembly depending on the direction of rotation.

BRIEF DESCRIPTION OF THE DRAWINGS

The above-mentioned and other features and advantages, and the manner of attaining them, will become more apparent and the invention will be better understood by reference to the following description of exemplary embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
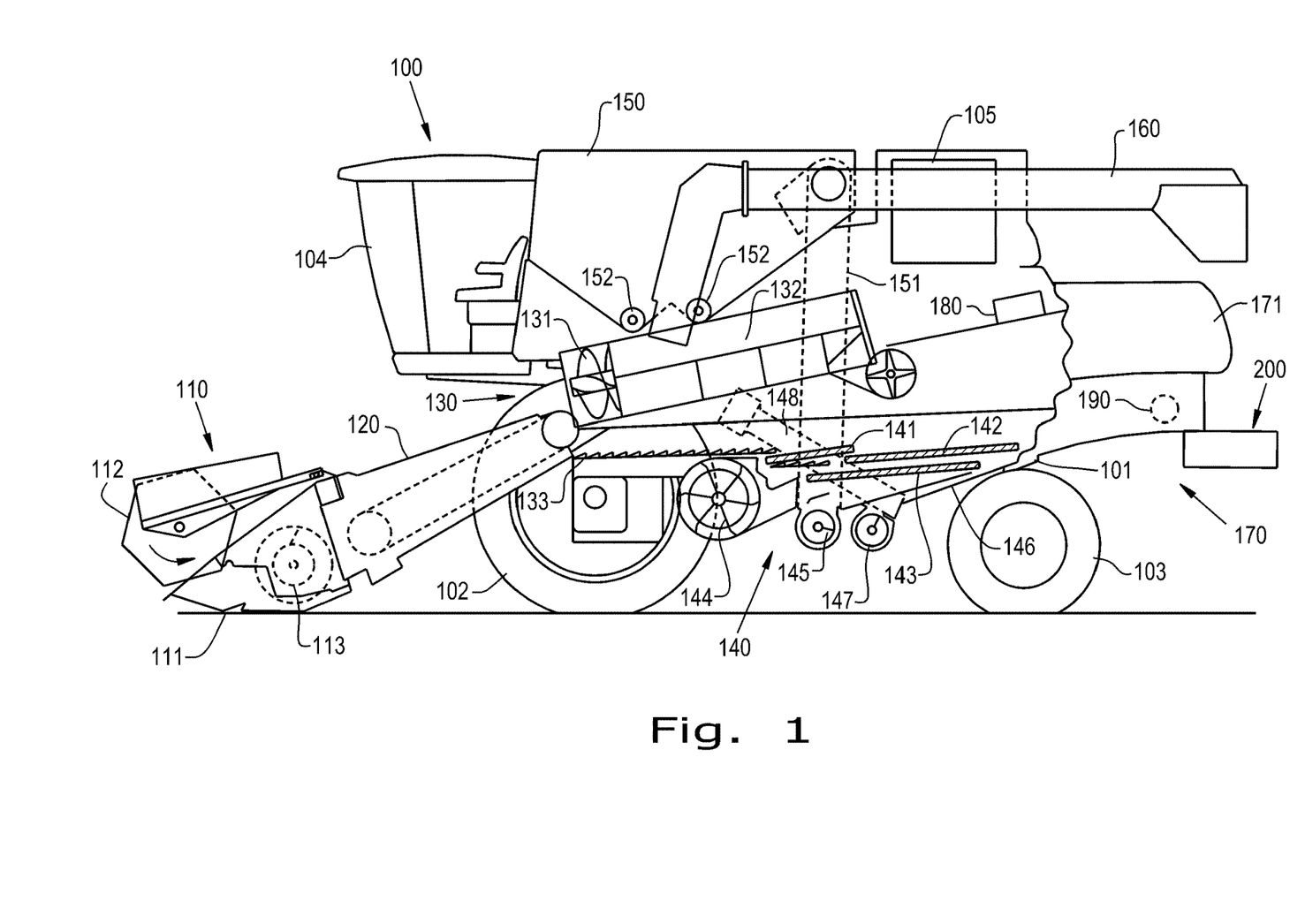
FIG. 1 is a side view of an exemplary embodiment of an agricultural vehicle formed in accordance with the present invention.

Referring now to the drawings, and more particularly to FIG. 1, there is shown an embodiment of an agricultural vehicle 100 in the form of a combine harvester which generally includes a chassis 101, ground engaging wheels 102 and 103, header 110, feeder housing 120, operator cab 104, threshing and separating system 130, cleaning system 140, grain tank 150, and unloading conveyance 160. Front wheels 102 are larger flotation type wheels, and rear wheels 103 are smaller steerable wheels. Motive force is selectively applied to front wheels 102 through a power plant in the form of a diesel engine 105 and a transmission (not shown). Although combine 100 is shown as including wheels, is also to be understood that combine 100 may include tracks, such as full tracks or half tracks.

Header 110 is mounted to the front of combine 100 and includes a cutter bar 111 for severing crops from a field during forward motion of combine 100. A rotatable reel 112 feeds the crop into header 110, and a double auger 113 feeds the severed crop laterally inwardly from each side toward feeder housing 120. Feeder housing 120 conveys the cut crop to threshing and separating system 130, and is selectively vertically movable using appropriate actuators, such as hydraulic cylinders (not shown).

Threshing and separating system 130 is of the axial-flow type, and generally includes a threshing rotor 131 at least partially enclosed by a rotor cage and rotatable within a corresponding perforated concave 132. The cut crops are threshed and separated by the rotation of rotor 131 within concave 132, and larger elements, such as stalks, leaves and the like are discharged from the rear of combine 100. Smaller elements of crop material including grain and non-grain crop material, including particles lighter than grain, such as chaff, dust and straw, are discharged through perforations of concave 132. Threshing and separating system 130 can also be a different type of system, such as a system with a transverse rotor rather than an axial rotor, etc.

Grain which has been separated by the threshing and separating assembly 130 falls onto a grain pan 133 and is conveyed toward cleaning system 140. Cleaning system 140 may include an optional pre-cleaning sieve 141, an upper sieve 142 (also known as a chaffer sieve or sieve assembly), a lower sieve 143 (also known as a cleaning sieve), and a cleaning fan 144. Grain on sieves 141, 142 and 143 is subjected to a cleaning action by fan 144 which provides an air flow through the sieves to remove chaff and other impurities such as dust from the grain by making this material airborne for discharge from a straw hood 171 of a residue handling system 170 of combine 100. Optionally, the chaff and/or straw can proceed through a chopper 180 to be further processed into even smaller particles before discharge out of the combine 100. It should be appreciated that the "chopper" 180 referenced herein, which may include knives, may also be what is typically referred to as a "beater", which may include flails, or other construction and that the term "chopper" as used herein refers to any construction which can reduce the particle size of entering crop material by various actions including chopping, flailing, etc. Grain pan 133 and pre-cleaning sieve 141 oscillate in a fore-to-aft manner to transport the grain and finer non-grain crop material to the upper surface of upper sieve 142. Upper sieve 142 and lower sieve 143 are vertically arranged relative to each other, and likewise oscillate in a fore-to-aft manner to spread the grain across sieves 142, 143, while permitting the passage of cleaned grain by gravity through the openings of sieves 142, 143.

Clean grain falls to a clean grain auger 145 positioned crosswise below and toward the front of lower sieve 143. Clean grain auger 145 receives clean grain from each sieve 142, 143 and from a bottom pan 146 of cleaning system 140. Clean grain auger 145 conveys the clean grain laterally to a generally vertically arranged grain elevator 151 for transport to grain tank 150. Tailings from cleaning system 140 fall to a tailings auger trough 147. The tailings are transported via tailings auger 147 and return auger 148 to the upstream end of cleaning system 140 for repeated cleaning action. A pair of grain tank augers 152 at the bottom of grain tank 150 convey the clean grain laterally within grain tank 150 to unloader 160 for discharge from combine 100.

Figure 2:
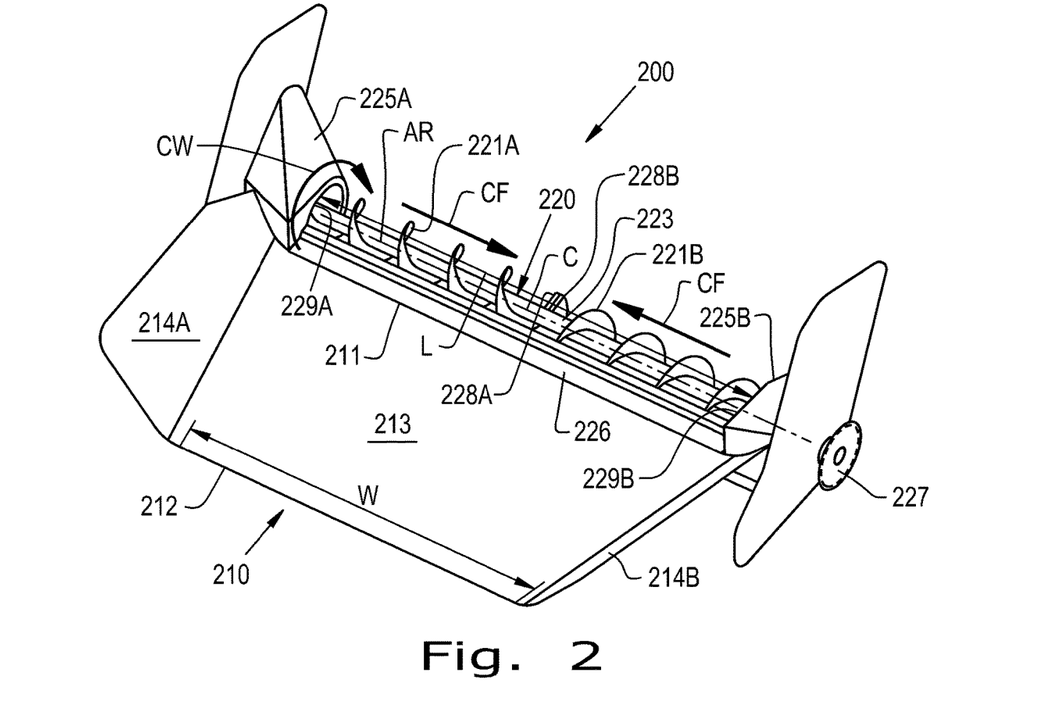
FIG. 2 is a perspective view of an exemplary embodiment of a windrow assembly formed in accordance with the present invention with a rotatable conveyor which incorporates auger flightings.

Referring now to FIG. 2, an exemplary embodiment of a windrow assembly 200 formed according to the present invention is shown which is carried by the chassis 101 and includes a windrow chute 210 defining a leading edge 211 downstream from the chopper 180, a trailing edge 212 downstream from the leading edge 211, and a chute surface 213 bound by the edges 211, 212 and a pair of upstanding surfaces 214A, 214B and which directs crop material toward the ground while the crop material exits the vehicle 100. In the instances where the windrow assembly 200 is not mounted to the vehicle 100, the trailing edge 212 can be described as being opposite to the leading edge 211. It should be appreciated that while the windrow assembly 200 is shown as being included in a combine harvester 100, the windrow assembly 200 can also be included in other agricultural vehicles, such as vehicles commonly referred to as "windrowers." As shown, the upstanding surfaces 214A, 214B can be fixed in place to define a windrow width W of the windrow assembly 200, but it should be appreciated that the fixed upstanding surfaces 214A, 214B can be replaced with, for example, movable vanes that allow for adjustment of the windrow width W during operation.

As can be seen, the windrow assembly 200 includes a rotatable conveyor 220, shown as a rotatable shaft, associated with the leading edge 211 of the windrow chute 210 and having a pair of conveyor projections 221A, 221B, shown as auger flightings, projecting from a surface 223 of the rotatable conveyor 220 by, for example, being welded or otherwise connected so as to extend from the surface 223 during rotation. As used herein, the rotatable conveyor 220 is "associated" with the leading edge 211 in the sense that the rotatable conveyor 220 is placed adjacent to the leading edge 211 so, during rotation, the conveyor projections 221A, 221B can convey material away from the leading edge 211 to reduce and/or prevent material accumulation at the leading edge 211. The rotatable conveyor 220 can, for example, be journaled within side interfaces 225A, 225B which are mounted to the windrow chute 210 by a mounting 226 bolted to the chute surface 213 and covering the leading edge 211 of the windrow chute 210. The rotatable conveyor 220 can be driven by, for example, a gear 227 or other rotational coupling that couples the rotatable conveyor 220 to a source of rotational motion during operation, such as a rotatable element 190 shown in FIG. 1, rotating the conveyor projections 221A, 221B during rotation of the rotatable conveyor 220. As shown in FIG. 1, the rotatable element 190 can be a shaft rotated by coupling to a power take-off (not shown) or other rotating element of the vehicle 100 or, alternatively, can be a motor which is powered to rotate an output shaft 190 coupled to the gear 227. While the rotatable conveyor 220 is shown with multiple conveyor projections 221A, 221B, it should be appreciated that the rotatable conveyor 220 can be formed to only have one conveyor projection.

Figure 4:
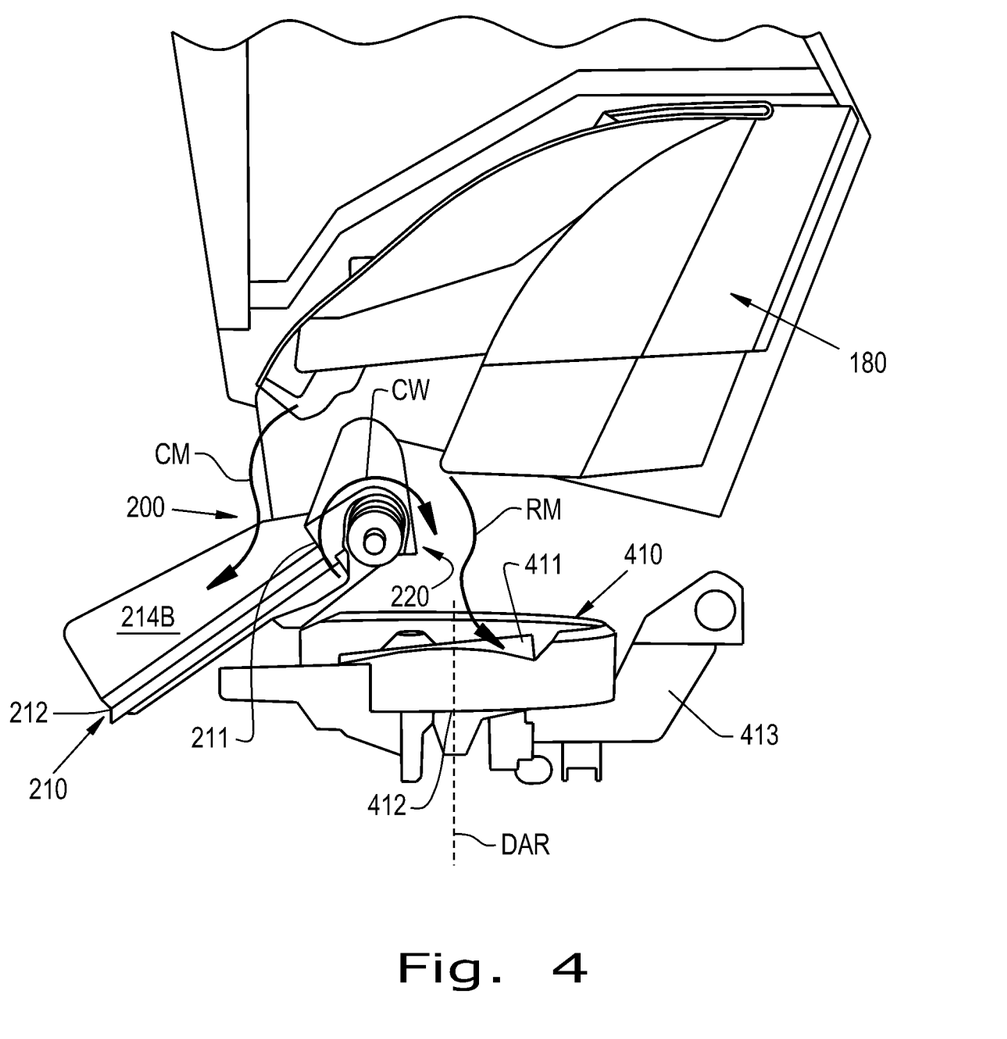
FIG. 4 is a side view illustrating crop material movement toward a spreader assembly during rotation of the auger flightings shown in FIG. 2 or 3.

As can be seen in FIG. 2, the auger flighting 221A, which can be referred to as a first auger flighting, and the auger flighting 221B, which can be referred to as a second auger flighting, both define helical shapes which wrap around an axis of rotation AR of the rotatable conveyor 220. The helical shape of the flightings 221A, 221B can be adjusted as desired to adjust the conveyance behavior of the flightings 221A, 221B during rotation. As shown, the first auger flighting 221A can be formed as a right-handed helix and the second auger flighting 221B can be formed as a left-handed helix, i.e., the auger flightings 221A, 221B can have opposite helical orientations, so as the flightings 221A, 221B rotate in a clockwise direction, indicated by arrow CW, crop material will tend to be conveyed by the flightings 221A, 221B toward a center C of a length L of the rotatable conveyor 220 away from the side interfaces 225A, 225B, with crop material conveyance being indicated by arrows CF. It should be appreciated that the description of the direction CW as "clockwise" is only for convenience of description, and is not intended to be limiting. Further, as the flightings 221A, 221B rotate, the crop material will tend to be conveyed by flightings 221A, 221B away from both the leading edge 211 and trailing edge 212, as shown in FIG. 4, toward a spreader assembly 410, as described further herein. The first flighting 221A can have a first end 228A adjacent the center C of the length L which abuts against a first end 228B of the second flighting 221B, so the flightings 221A, 221B meet approximately at the center C of the length L. Each flighting 221A, 221B can also have a corresponding second end 229A, 229B located adjacent to a respective side interface 225A, 225B so the flightings 221A, 221B can convey material away from the side interfaces 225A, 225B and reduce the risk of crop material stagnating near the side interfaces 225A, 225B.

Figure 3:
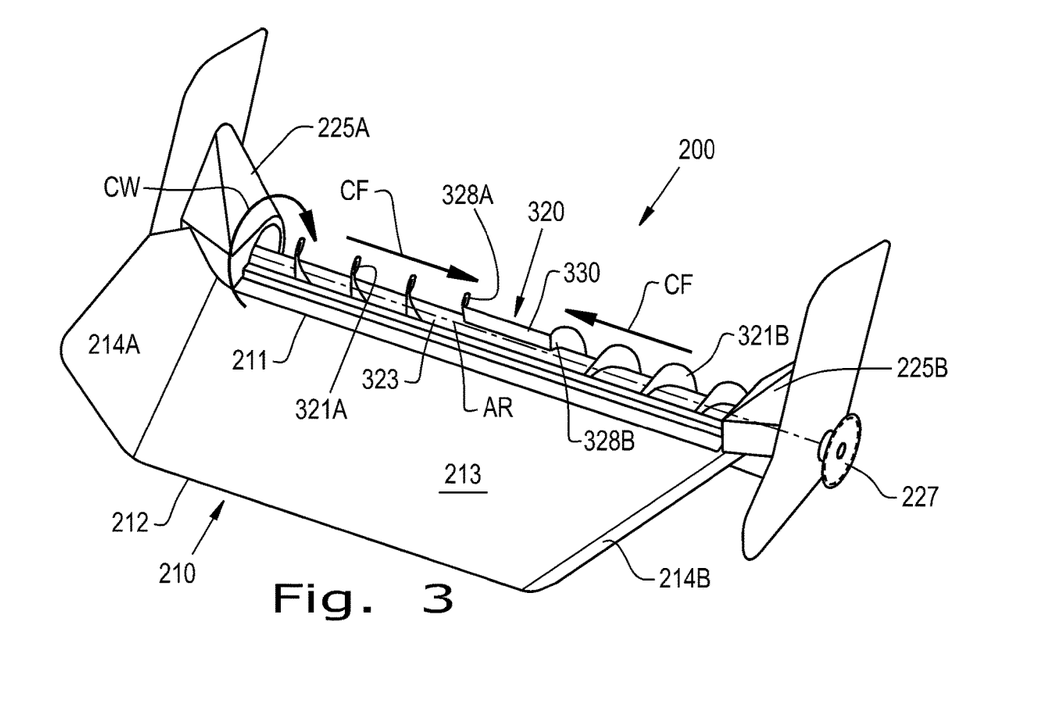
FIG. 3 is a perspective view of another exemplary embodiment the windrow assembly shown in FIG. 2 with another exemplary embodiment of a rotatable conveyor which incorporates auger flightings.

Referring now to FIG. 3, another exemplary embodiment of a rotatable conveyor 320 formed in accordance with the present invention is shown associated with the leading edge 211 of the windrow chute 210. As can be seen, the rotatable conveyor 320 also includes a pair of auger flightings 321A, 321B extending from a surface 323 of the rotatable conveyor 320, with the auger flighting 321A being a right-handed helix and the auger flighting 321B being a left-handed helix, similar to previously described auger flightings 221A and 221B. Unlike the previously described rotatable conveyor 220, the rotatable conveyor 320 has a paddle 330 between the auger flightings 321A, 321B which can convey crop material toward the chute surface 213 and/or toward the spreader assembly 410 during rotation of the rotatable conveyor 330 about an axis of rotation AR. As can be seen, the paddle 330 can connect respective first ends 328A, 328B of the auger flightings 321A, 321B, rather than the first ends 328A, 328B abutting against one another. The flightings 321A, 321B can thus generally convey crop material toward the spreader assembly 410 as well as laterally, signified by arrows CF, during rotation in a clockwise direction CW, while the paddle 330 can generally convey crop material toward the spreader assembly 410. In such a configuration, the flightings 321A, 321B can be shaped to mostly convey crop material laterally away from the side interfaces 225A, 225B in the directions CF toward the paddle 330 during clockwise rotation, with the paddle 330 shaped to mostly convey crop material toward the spreader assembly 410 during clockwise rotation.

Referring now to FIG. 4, crop material conveyance by the rotatable conveyors 220, 320 shown in FIGS. 2 and 3 is illustrated as either of the rotatable conveyors 220, 320 rotate in the clockwise direction CW, as previously described. For ease of description, only the rotatable conveyor 220 is described as being the rotatable conveyor in FIG. 4, but it should be appreciated that the rotatable conveyor 320 can be substituted for the rotatable conveyor 220 with a similar general effect. As can be seen, free flowing crop material which has passed through the chopper 180, signified by arrow CM, can pass over the rotatable conveyor 220 onto the chute surface 213 of the windrow chute 210 for windrowing. Any crop material that does not make it to the chute surface 213 from the chopper 180 and which may accumulate at the leading edge 211 can be grabbed and conveyed by the auger flightings 221A, 221B away from the side interfaces 225A, 225B and toward the spreader assembly 410 during rotation, as indicated by arrow RM.

As shown, the spreader assembly 410 has one or more fins 411 carried by a rotatable spreader disc 412 which can spread the crop material to a field as the spreader disc 412 rotates about a disc axis of rotation DAR. The spreader assembly 410 can be placed below the leading edge 211 of the windrow chute 210 and rotatable conveyor 220 so crop material that drops from the chopper 180 and does not make it to the chute surface 213 and/or rotatable conveyor 220 drops into the spreader assembly 410. The spreader assembly 410 can be mounted to the chassis 101 by a spreader arm 413, which may be fixedly attached to the chassis 101 or pivotably attached to the chassis 101, as desired. It should be appreciated that the rotatable conveyor 220 can be selectively controlled to rotate in the clockwise direction CW so crop material is directed toward the spreader assembly 410 only when spreading is desired or may, alternatively, be controlled to always rotate in the clockwise direction CW.

Figure 5:
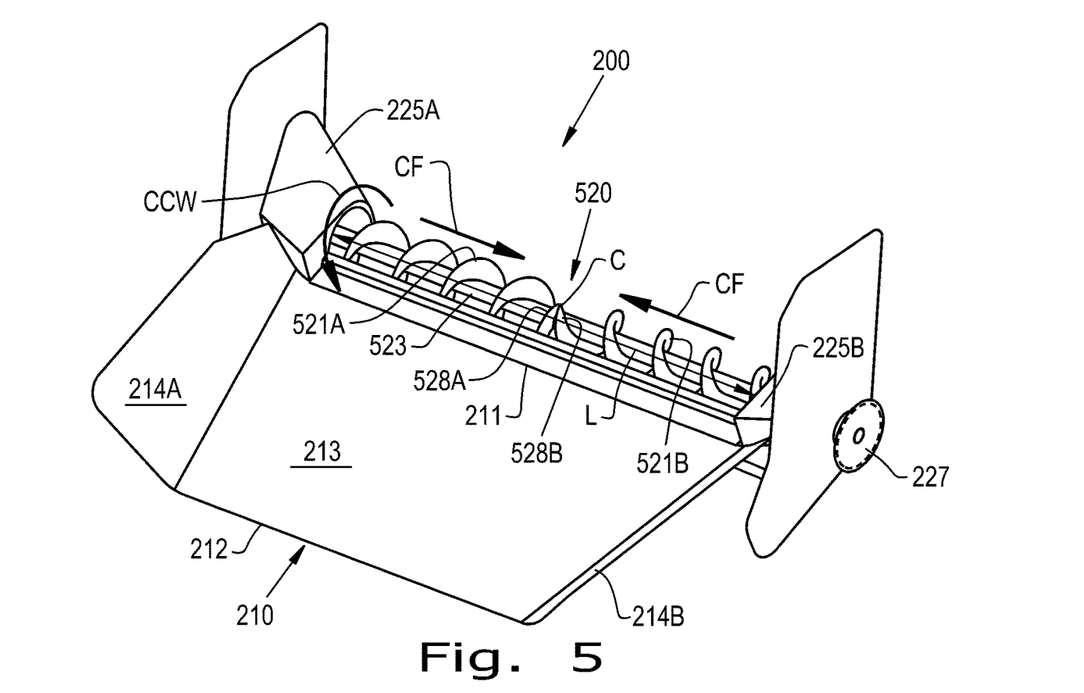
FIG. 5 is a perspective view of the windrow assembly shown in FIG. 2 with another exemplary embodiment of a rotatable conveyor which incorporates auger flightings.

Referring now to FIG. 5, yet another exemplary embodiment of a rotatable conveyor 520 formed in accordance with the present invention is shown associated with the leading edge 211 of the windrow chute 210. As can be seen, the rotatable conveyor 520 is similar to the rotatable conveyor 220 shown in FIG. 2, except that a first auger flighting 521A extending from a surface 523 of the rotatable conveyor 520 is a left-handed helix and a second auger flighting 521B extending from the surface 523 is a right-handed helix, i.e., the auger flightings 521A, 521B of the rotatable conveyor 520 are oriented oppositely to the corresponding auger flightings 221A, 221B of the rotatable conveyor 220. By orienting the auger flightings 521A, 521B in such a manner, rotation of the auger flightings 521A, 521B in a counter-clockwise direction, indicated by arrow CCW, can convey crop material laterally, indicated by arrows CF, toward a center C of a length L of the rotatable conveyor 520 as well as toward the chute surface 213 of the windrow chute 210, as opposed to the spreader assembly 410. Thus, the rotatable conveyor 520 can direct crop material from the chopper 180 toward the trailing edge 212 of the windrow chute 210 so that crop material which does not fully drop onto the chute surface 213 can be pushed by the flightings 521A, 521B down the chute surface 213 and drop off the windrow chute 210 onto a field. Similarly to the auger flightings 221A and 221B, the auger flightings 521A and 521B can have respective first ends 528A, 528B which abut against one another. In other regards, the rotatable conveyor 520 can be similar to the previously described rotatable conveyor 220.

Figure 6:
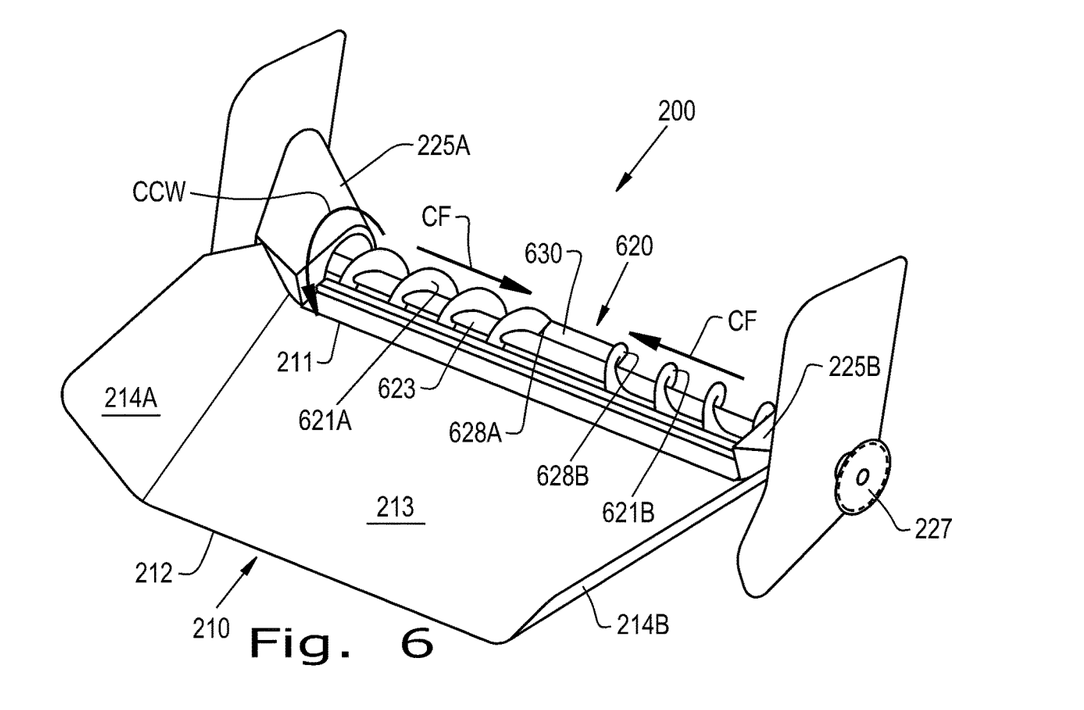
FIG. 6 is a perspective view of the windrow assembly shown in FIG. 2 with yet another exemplary embodiment of a rotatable conveyor which incorporates auger flightings.

Referring now to FIG. 6, yet another exemplary embodiment of a rotatable conveyor 620 formed in accordance with the present invention is shown associated with the leading edge 211 of the windrow chute 210. As can be seen, the rotatable conveyor 620 is similar to the rotatable conveyor 320 shown in FIG. 3, except that a first auger flighting 621A extending from a surface 623 of the rotatable conveyor 620 is a left-handed helix and a second auger flighting 621A extending from the surface 623 is a right-handed helix, i.e., the auger flightings 621A, 621B of the rotatable conveyor 620 are oriented oppositely relative to the auger flightings 321A, 321B of the rotatable conveyor 320. Similarly to the rotatable conveyor 320, the rotatable conveyor 620 can also include a paddle 630 between the auger flightings 621A, 621B which connects respective first ends 628A, 628B of the auger flightings 621A, 621B together. By orienting the auger flightings 621A, 621B in such a manner with the paddle 630 between the auger flightings 621A, 621B, rotation of the auger flightings 621A, 621B and paddle 630 in a counter-clockwise direction, signified by arrow CCW, the auger flightings 621A, 621B can convey crop material toward the chute surface 213, as well as laterally, indicated by arrows CF, toward the paddle 630 which can also convey crop material toward the chute surface 213. Thus, the rotatable conveyor 620 can direct crop material from the chopper 180 toward the trailing edge 212 of the windrow chute 210 so that crop material which does not fully drop onto the chute surface 213 can be pushed by the flightings 621A, 621B, as well as the paddle 630, down the chute surface 213 and drop off the windrow chute 210 onto a field. In other regards, the rotatable conveyor 620 can be similar to the previously described rotatable conveyor 320.

Figure 7:
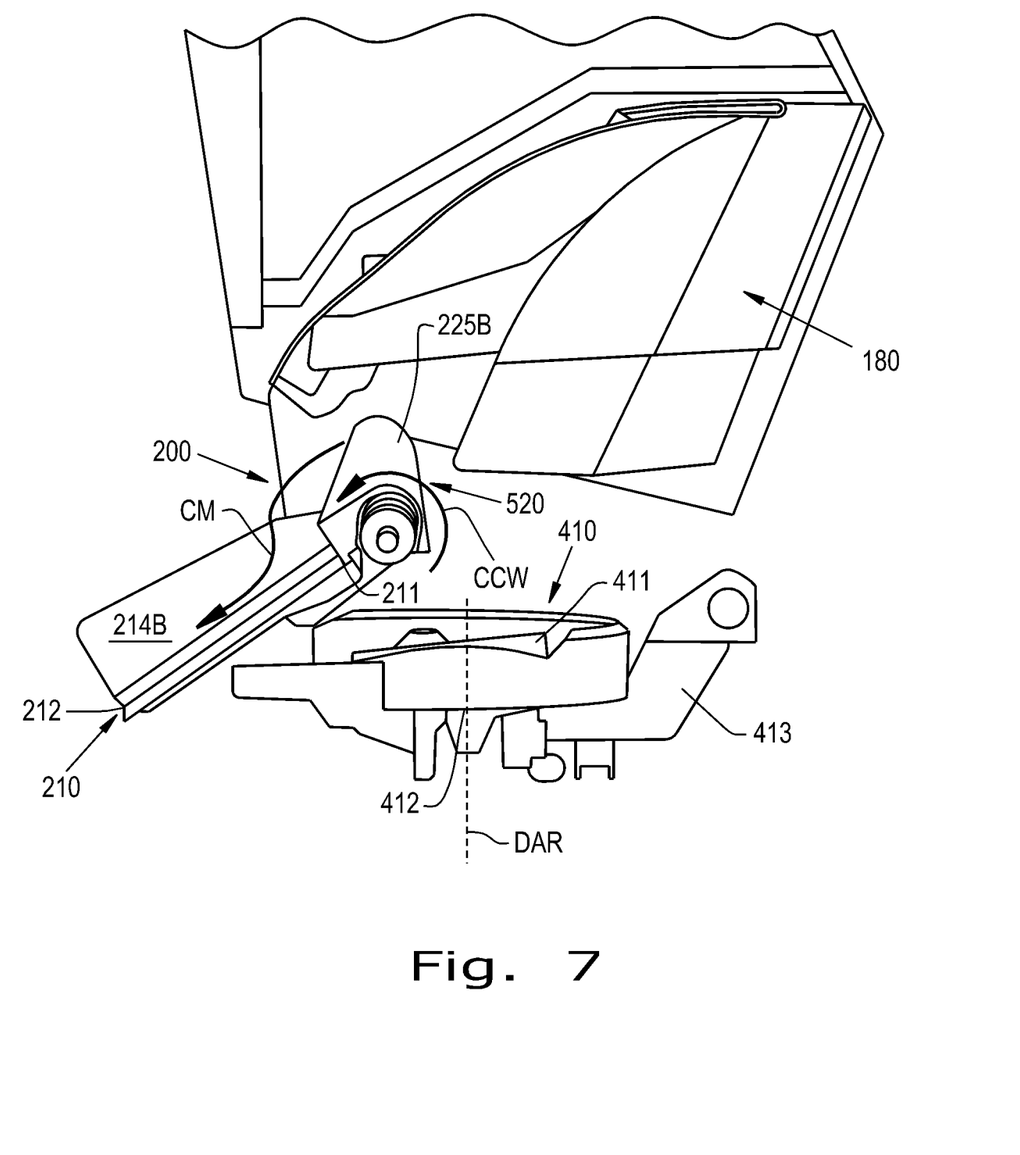
FIG. 7 is a side view illustrating crop material movement toward a chute surface during rotation of the auger flightings shown in FIG. 5 or 6.

Referring now to FIG. 7, crop material conveyance by the rotatable conveyors 520, 620 shown in FIGS. 5 and 6 is illustrated as either of the rotatable conveyors 520, 620 rotate in the counter-clockwise direction CCW, as previously described. For ease of description, only the rotatable conveyor 520 is described as being the rotatable conveyor in FIG. 7, but it should be appreciated that the rotatable conveyor 620 can be substituted for the rotatable conveyor 520 with a similar general effect. As can be seen, free flowing crop material which has passed through the chopper 180, signified by arrow CM, can pass over the rotatable conveyor 520 onto the chute surface 213 of the windrow chute 210 for windrowing. Any crop material that does not make it to the chute surface 213 from the chopper 180 and which may accumulate at the leading edge 211 can be grabbed and conveyed by the auger flightings 521A, 521B away from the side interfaces 225A, 225B and toward the chute surface 213 during rotation so the crop material can be windrowed onto the field. It should be appreciated that the rotatable conveyor 520 can be selectively controlled to rotate in the counter-clockwise direction CCW so crop material is directed toward the chute surface 213 only when windrowing is desired or may, alternatively, be controlled to always rotate in the counter-clockwise direction CCW.

From the foregoing description, it should be appreciated that the rotatable conveyors 220, 320, 520, 620 with conveyor projections in the form of auger flightings 221A, 221B, 321A, 321B, 521A, 521B, 621A, 621B can be incorporated in the windrow assembly 200 to convey crop material in a variety of ways during rotation. The windrow assembly 200, therefore, may incorporate a mechanism to interchangeably couple the rotatable conveyors 220, 320, 520, 620 to a rotational coupling so the rotatable conveyor 220, 320, 520, 620 incorporated in the windrow assembly 200 may be changed depending on whether spreading or windrowing is desired and the desired aggressiveness of the crop material conveyance during rotation.

Figure 8:
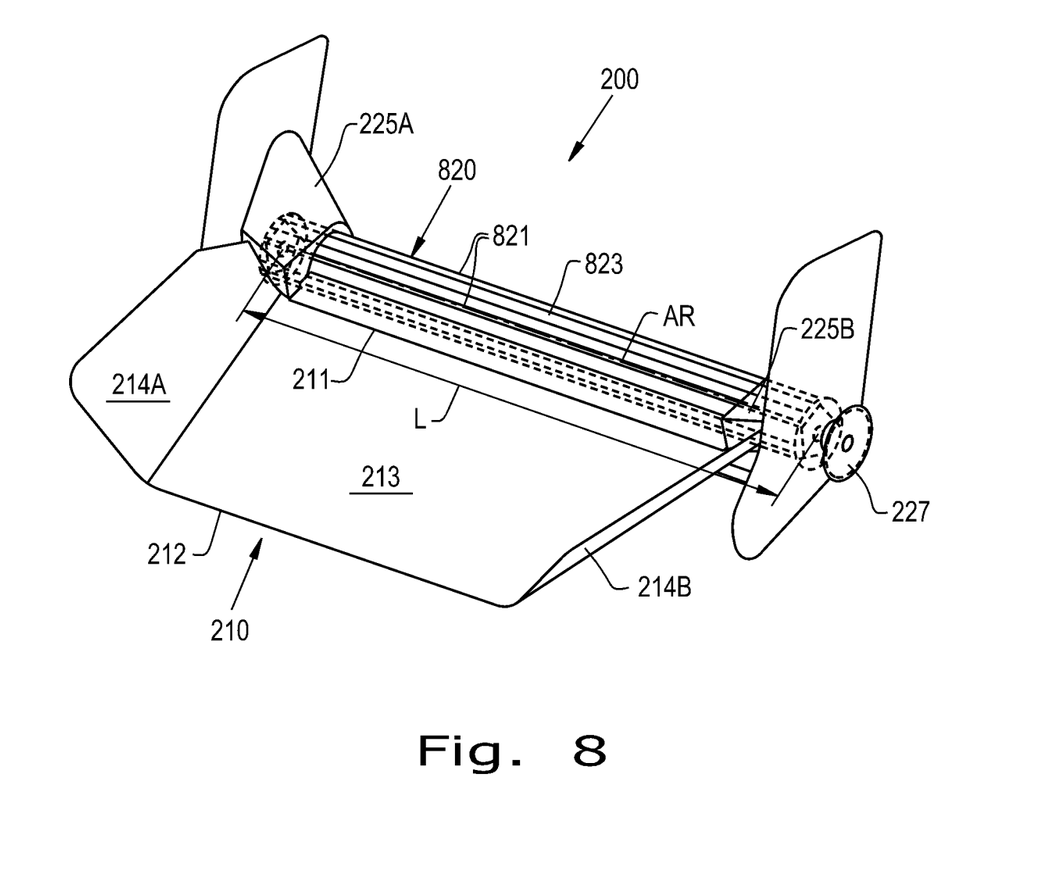
FIG. 8 is a perspective view of yet another exemplary embodiment of a windrow assembly formed in accordance with the present invention which incorporates beater paddles.
Figure 9:
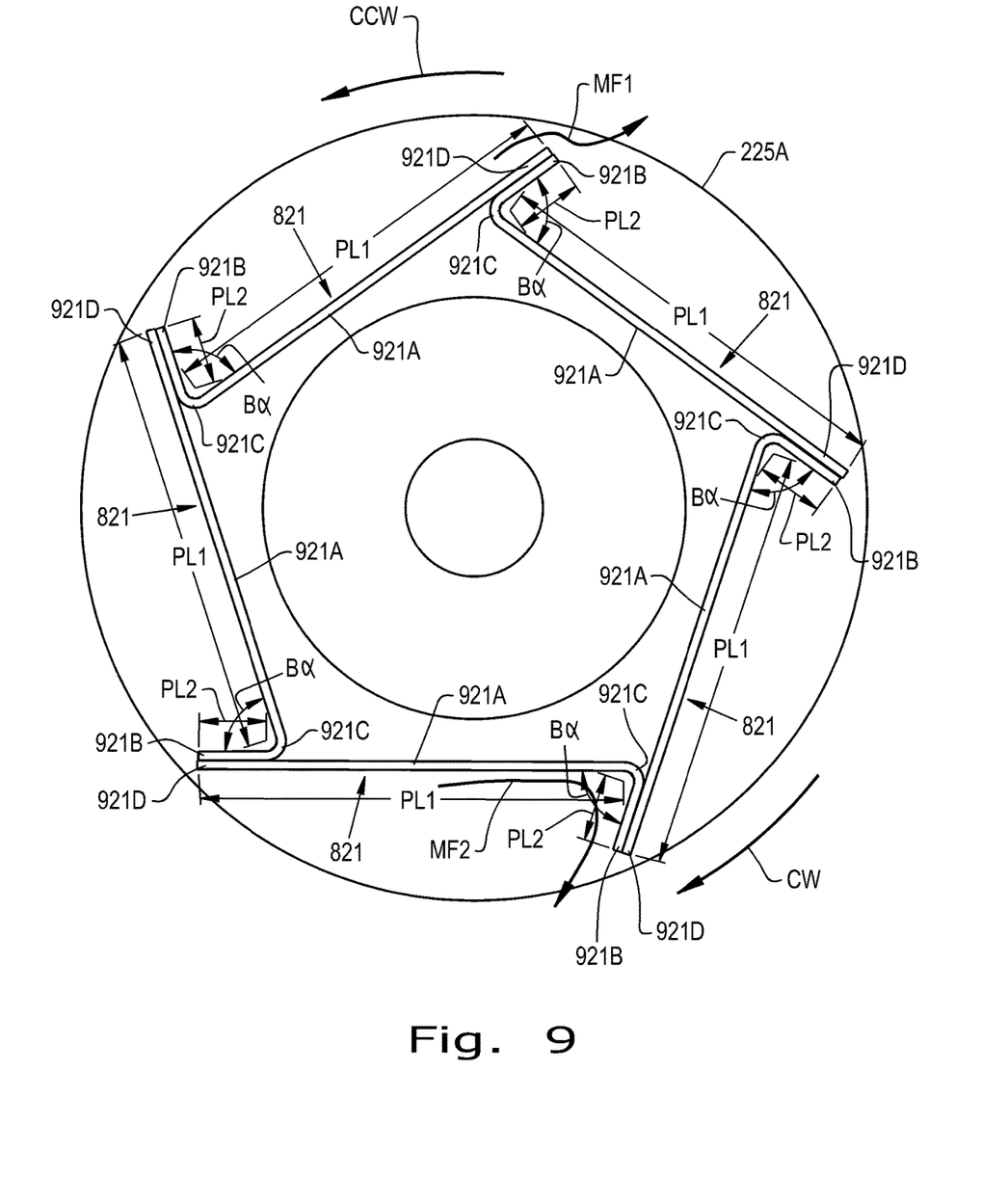
FIG. 9 is a cross-sectional view of the windrow assembly shown in FIG. 8 taken along line 9-9.
Figure 10:
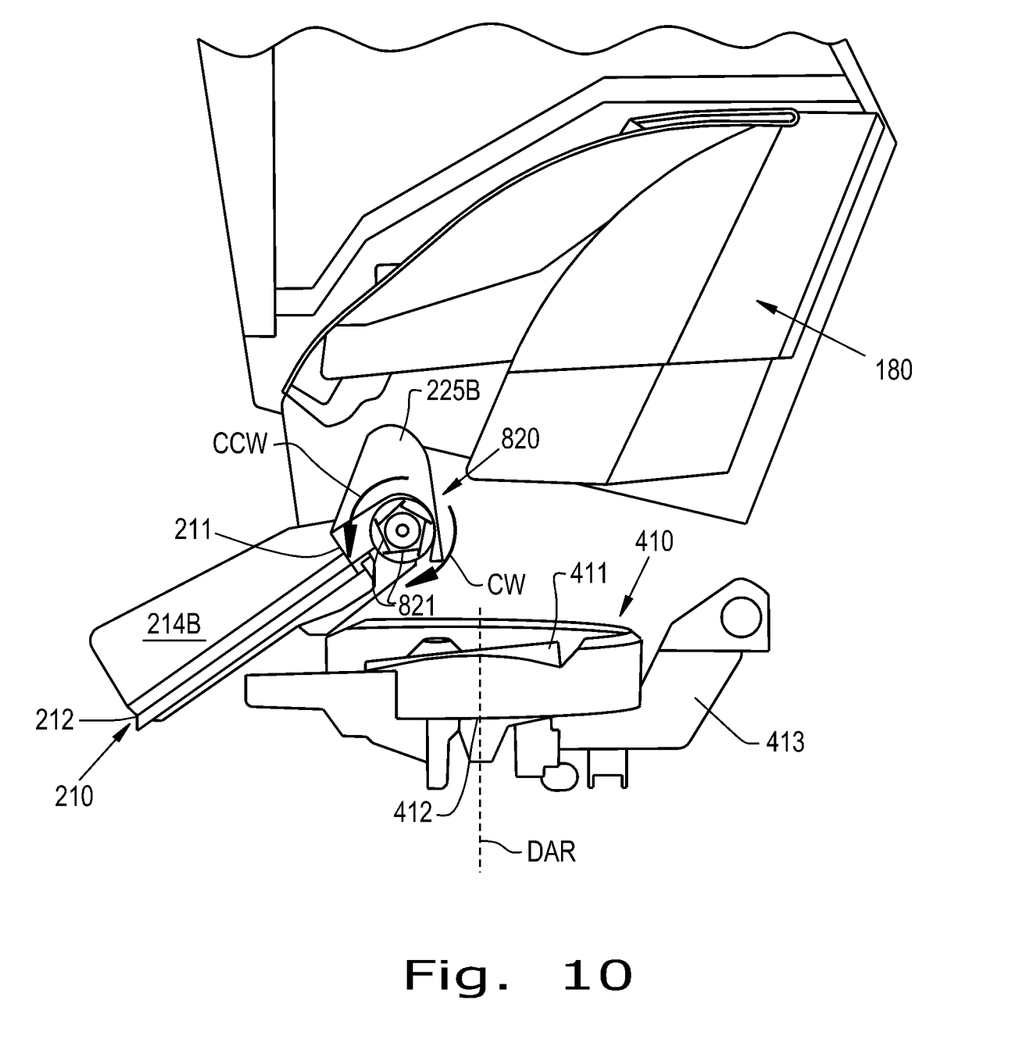
FIG. 10 is a side view illustrating crop material toward a chute surface or a spreader assembly during rotation of the beater paddles shown in FIGS. 8-9.

Referring now to FIGS. 8-10, yet another exemplary embodiment of a rotatable conveyor 820 formed in accordance with the present invention is shown associated with the leading edge 211 of the windrow chute 210. As shown, the rotatable conveyor 820 includes multiple beater paddles 821 extending from a surface 823 of the rotatable conveyor 820 which can beat crop material accumulating at the leading edge 211 of the windrow chute 210 and aggressively convey crop material toward the chute surface 213 and/or spreader assembly 410. As can be seen, edges 921D (shown in FIG. 9) of the beater paddles 821 can generally extend in a direction parallel to an axis of rotation AR of the rotatable conveyor 820 across a length L of the rotatable conveyor 820, with the beater paddles 821 being equally spaced apart from one another about the circumference of the rotatable conveyor 820. The beater paddles 821 may be, for example, bolted or welded to the surface 823 or, alternatively, may be formed as integrally as a part of the rotatable conveyor 820.

Referring specifically now to FIG. 9, it can be seen that the beater paddles 821 can each include a first straight portion 921A having a first portion length PL1, a second straight portion 921B having a second portion length PL2 which is less than the first portion length PL1, and a bent portion 921C connecting the first straight portion 921A to the second straight portion 921B. Each of the second straight portions 921B can be abutted against a respective first straight portion 921A to form a beater edge 921D which defines the beater height of each beater paddle 821 relative to the surface 823 and is approximately equal to the second portion length PL2. The first straight portions 921A and the second straight portions 921B can each define a respective portion axis PA1, PA2 therethrough which converge at the bent portions 921C to define a beater angle Bα of each beater paddle 821. The number of beater paddles 821 on the surface 823 and the beater angle Bα of each beater paddle 821 can be adjusted, as desired, to adjust the engagement characteristics of the beater paddles 821 with crop material during rotation of the rotatable conveyor 820. Further, the characteristics of the beater edges 921D can be adjusted to beat and remove material from the side interfaces 225A, 225B to reduce the risk of the side interfaces 225A, 225B being clogged by stagnant crop material.

As can be seen in FIGS. 9 and 10, when the beater paddles 821 rotate counter-clockwise, by arrow CCW, crop material that contacts the rotatable conveyor 820 will tend to convey off the longer first straight portions 921A, as indicated by arrow MF1, and flip toward the chute surface 213. When the rotatable conveyor 820 rotates counter-clockwise CCW to convey crop material toward the chute surface 213, the crop material being conveyed can generally be straw and other crop material for windrowing, which can be efficiently conveyed by the longer straight portions 921A of the beater paddles 821 during rotation. When the beater paddles 821 rotate clockwise, indicated by arrow CW, crop material that contacts the rotatable conveyor 820 will tend to convey off the shorter straight portions 921B and bent portions 921C, as indicated by arrow MF2, toward the spreader assembly 410. When the rotatable conveyor 820 rotates clockwise CW to convey crop material toward the spreader assembly 410, the crop material being conveyed can generally be chaff and other residue for spreading, which can be efficiently collected in the shorter straight portions 921B and bent portions 921C of the beater paddles 821 and conveyed during rotation. It should therefore be appreciated that the beater paddles 821 projecting from the surface 823 of the rotatable conveyor 820 can convey crop material near the leading edge 211 of the windrow chute 210 by flipping the crop material toward the chute surface 213 or spreader assembly 410, depending on the rotation direction CW, CCW, and thus reduce the risk of crop material accumulating and stagnating at both the trailing edge 211 and the side interfaces 225A, 225B.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:
1. An agricultural vehicle, comprising:
a chassis;
a header carried by said chassis and configured to cut crop material;
a chopper carried by said chassis downstream of said header;
a spreader assembly carried by said chassis downstream of said chopper; and
a windrow assembly carried by said chassis downstream of said chopper, said windrow assembly including:
a windrow chute defining a chute surface and a leading edge downstream from said chopper; and
a rotatable conveyor associated with said leading edge and having a surface with at least one conveyor projection extending from said surface, said at least one conveyor projection being configured to convey crop material toward at least one of said chute surface or said spreader assembly during rotation, said rotatable conveyor being positioned such that said at least one conveyor projection conveys crop material near said leading edge toward said chute surface when said rotatable conveyor rotates in a first direction and said at least one conveyor projection conveys crop material near said leading edge toward said spreader assembly when said rotatable conveyor rotates in a second direction that is opposite to the first direction.

2. The agricultural vehicle according to claim 1, wherein said at least one conveyor projection comprises a first auger flighting and a second auger flighting.

3. The agricultural vehicle according to claim 2, wherein said first auger flighting defines a first helical orientation and said second auger flighting defines a second helical orientation opposite of said first helical orientation.

4. The agricultural vehicle according to claim 3, further comprising a paddle between said first auger flighting and said second auger flighting.

5. The agricultural vehicle according to claim 4, wherein said paddle connects an end of said first auger flighting to an end of said second auger flighting.

6. The agricultural vehicle according to claim 3, wherein an end of said first auger flighting abuts against an end of said second auger flighting.

7. The agricultural vehicle according to claim 1, wherein said at least one conveyor projection comprises a plurality of beater paddles.

8. The agricultural vehicle according to claim 7, wherein each of said plurality of beater paddles includes a first straight portion having a first portion length, a second straight portion having a second portion length less than said first portion length, and a bent portion connecting said first straight portion and said second straight portion.

9. The agricultural vehicle according to claim 8, wherein each second straight portion abuts against a respective first straight portion.

10. The agricultural vehicle according to claim 7, wherein said rotatable conveyor defines an axis of rotation and each of said plurality of beater paddles defines a beater edge which generally extends parallel to said axis of rotation.

\* \* \* \* \*